Feb. 10, 1942.    C. M. HATHAWAY    2,272,772
ELECTRICAL MEASURING APPARATUS
Filed June 4, 1940
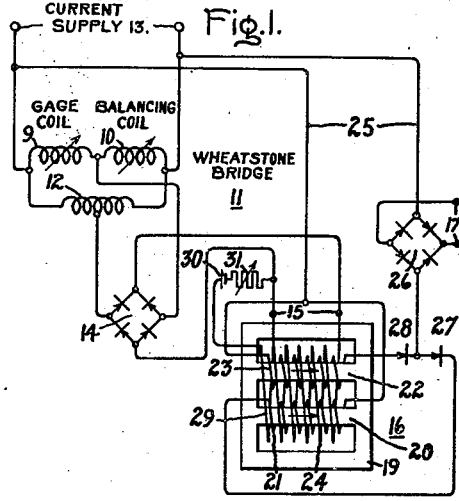
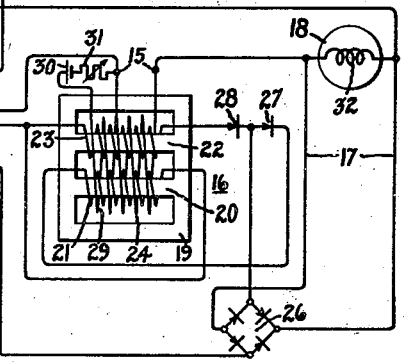
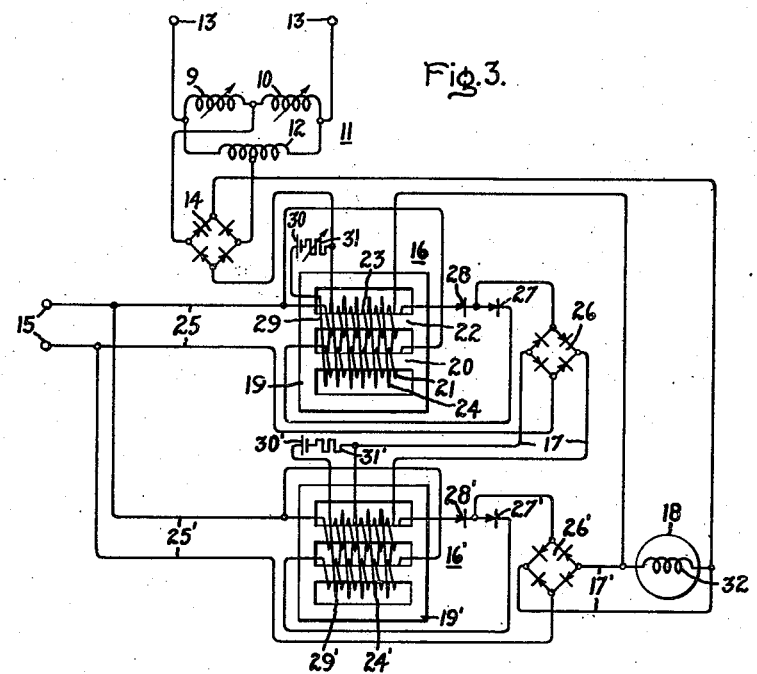
Inventor:
Claude M. Hathaway,
by Harry E. Dunham
His Attorney.

Patented Feb. 10, 1942

2,272,772

UNITED STATES PATENT OFFICE 2,272,772

ELECTRICAL MEASURING APPARATUS

Claude M. Hathaway, Denver, Colo., assignor to General Electric Company, a corporation of New York Application June 4, 1940, Serial No. 338,757

9 Claims. (Cl. 171—95)

This invention relates to electrical measuring apparatus and more particularly to apparatus for the detection, measurement and recording of electrical effects of small magnitude or energy level.

It is an object of my invention to provide improved apparatus for amplifying and measuring small alternating and direct current quantities which makes possible the use of low-cost, low-sensitivity electrical measuring instruments.

It is another object of my invention to provide improved measuring apparatus which shall be responsive to feeble electrical currents and which is suitable for use with various types of electrical measuring instruments requiring the production of a relatively high torque for their operation.

It is a further object of my invention to provide a new and improved electrical measuring device for use with measuring circuits of limited output power whereby minute electrical effects proportional to the measured quantity may be reproduced in an amplified form in order to obtain sufficient power for operating recording devices and the like.

It is still another object of my invention to provide an improved electrical measuring device which combines the advantages of highly sensitive indicating instruments with a circuit capable of delivering sufficient energy proportional to the measured quantity for operating continuous recorders or other devices requiring a relatively high torque.

It is a still further object of my invention to provide a new and improved electrical measuring apparatus of the stabilized or degenerative feedback type.

It is another object of my invention to provide a simple form of measuring apparatus of durable construction which may be manufactured economically and which will be dependable in operation over a long period of time.

Further objects and advantages will become apparent as the description proceeds.

In the measurement of various quantities or electrical effects, electric gages, for example, are often employed and it is customary in many instances to connect the gage element in a Wheatstone bridge circuit. The energy level of the output of the bridge in the unbalanced condition may be sufficient in some cases to operate indicating instruments directly so that sufficient sensitivity can be obtained without the use of an amplifier. In many cases, however, in order to obtain sufficient sensitivity without an amplifier, special high-sensitivity instruments are required. Furthermore, if the output of the bridge is to operate a recording device, some sort of amplifier is often required since the power required to operate an ordinary recording instrument is generally much greater than the gage or bridge circuit can supply. The apparatus of my invention provides a solution of this problem.

In accordance with an illustrated embodiment of my invention, I employ a magnetic amplifier in connection with the output of the bridge circuit and I connect an indicating instrument into the output of this magnetic amplifier. The amplifier which is employed is of the saturable core reactor type having its alternating current windings arranged and connected in such a manner that there is never a reversal of the magnetic flux in the core with respect to the flux produced by its direct current input winding. Because of this relation between the direction of the flux produced by the various windings, the direct current input winding need not carry a maximum current sufficiently high to prevent the variable reactance winding from reversing the flux therethrough, as is the case with the ordinary type of saturable core reactor. The result is that a given amount of output power can be obtained with a much smaller direct current flowing in the input winding. In other words, the gain of the amplifier is considerably increased. In the illustrated embodiment where alternating current is to be measured, I connect a rectifier element to the output of the bridge and the output of this rectifier is connected to the direct current input winding of the amplifier.

In a modified arrangement I connect the measuring instrument in series circuit relation with the input winding of the magnetic amplifier and the output terminals of a rectifier, the input terminals of which are connected to the bridge or alternating current quantity to be measured. The measuring instrument is also included in the direct current output circuit of the amplifier. The amplifier thus controls the voltage across the coil of the measuring element. In this way, a high torque instrument may be operated from the gage circuit.

In still another modification I provide a plurality of magnetic amplifiers connected in cascade relation to obtain increased amplification.

My invention will be better understood from the following description taken in connection with the accompanying drawing and its scope will be pointed out in the appended claims. In the drawing, Fig. 1 is a diagrammatic showing of an embodiment of my invention; Fig. 2 is an improved modification provided with means for obtaining sufficient output for operating high torque instruments; and Fig. 3 is a modification of Fig. 2 showing a cascaded connection of a plurality of amplifiers.

In order to illustrate the principles of my invention, I have shown its use in connection with electric gages of the type in which the reactance of a coil is changed in accordance with variations in the measured quantity. It will be appreciated, however, that the advantages to be derived from the practice of my invention are not restricted to this particular use but this merely forms a very useful field of application. Furthermore, the alternating current quantity to be measured need not be one derived from a bridge circuit, and of course the invention may be employed for the measurement of direct current quantities directly, as will be well understood by those skilled in the art.

Referring now to the drawing and more particularly to Fig. 1, I have shown therein a conventional variable inductance gage coil 9 and a balancing coil 10 connected in adjacent arms of a Wheatstone bridge circuit 11, the remaining arms of the bridge being formed by a center-tapped reactive element 12. The bridge is excited by an alternating current source of supply 13 and the output of the bridge is shown connected to a full-wave rectifier element 14 which may be of any suitable type, such for example as the conventional copper-oxide type. The output of the rectifier element 14 is in turn connected to the input terminals 15 of a magnetic amplifier 16 and the output terminals 17 of the amplifier are connected to an electrical indicating or recording device 18.

The amplifier 16 comprises a conventional four-leg saturable reactor-type core 19 of magnetic material, preferably of a material having a relatively high permeability. A material which may be employed with highly satisfactory results is a nickel-iron alloy, such as described in United State patent to Elmen 1,586,884 of June 1, 1926. Such nickel alloys are characterized by a nickel content exceeding 75% and by their property of being saturable with extremely low values of magnetizing force. Increased effectiveness is therefore obtainable by the use of such a material, particularly where the input power level or quantity to be measured is of low magnitude. I wish to point out, however, that in carrying out my invention I may also use a magnetic material known as "mu" metal, if desired, since it is not my intention that the invention shall be limited to the use of a particular material.

On the leg 20 of the magnetic core 19 is wound a variable reactance winding 21 and on the leg 22 is wound a variable reactance winding 23. Linking both legs 20 and 22 of the core 19 and preferably wound on top of the reactance windings 21 and 23 is a direct current control or input winding 24.

The reactance windings 21 and 23 are connected in parallel relation to each other in an alternating current circuit 25 which may be energized with a suitable voltage from the source of supply 13. A conventional full-wave rectifier element 26 is connected in the circuit 25 to produce a unidirectional voltage at the amplifier output terminals 17 to which is connected the measuring device 18. In series circuit relation with the reactance winding 21 is a unidirectional conducting device 27 and in series with the winding 23 is a unidirectional conducting device 28. These devices which may be of any suitable type, such as conventional copper-oxide rectifiers, are reversely connected with respect to the current flow in the auxiliary supply and measuring circuit 25 so that, for example, positive half cycles of current flow through the winding 21 and negative half cycles of current flow through the winding 23. In this manner, alternating current circulates in the circuit 25 and through the rectifier bridge 26 which supplies the measuring instrument 18 but only pulsating unidirectional currents are allowed to flow in each of the reactance windings 21 and 23. In addition, these reactance windings are so connected or wound on their respective cores or legs that the pulsating unidirectional fluxes which they produce are in the same direction with respect to the unidirectional flux produced by the input winding 24. For example, as the coils are arranged in the drawing, these fluxes will be in the direction indicated by the arrows.

Thus, the input winding 24 is energized with a unidirectional current which is proportional in magnitude to the quantity to be measured and which is of such a polarity that the flux which it produces will have the same direction in the legs 20 and 22 as the fluxes produced by the reactance windings 21 and 23.

By properly selecting the number of turns of the reactance windings 21 and 23 with regard to the voltage impressed on the circuit 25 and the impedance of the instrument 18 and the rectifier elements 26, 27, and 28, the major portion of the voltage of the circuit 25 can be made to appear across the reactance windings when no current flows in the direct current input winding 24. Thus, for example, during the flow of each positive half cycle of current the permeability of the core 19 will be quite high resulting in a high inductance or reactance of the winding 21. Consequently, a current of small magnitude will flow in the circuit 25. For negative half cycles, the same will be true of the reactance winding 23.

As explained hereinbefore, inasmuch as the reactance coils 21 and 23 carry a unidirectional current, they produce a corresponding unidirectional flux in the magnetic core 19. The effect of this unidirectional flux is to reduce the reactance of these coils and consequently considerably more current would flow in the measuring instrument 18 even though there is no current flowing in the input winding 24. I therefore, preferably provide a compensating winding 29 which is wound about the legs 20 and 22 of the core 19 in much the same manner as the direct current input winding 24. For convenience in manufacture the coil elements 24 and 29 may be wound as a single coil and provided with an intermediate tap. This compensating winding is a direct current winding and in the arrangement shown is energized from a direct current supply source 30, such as a storage battery. However, for convenience I may derive the direct current necessary for exciting this winding from the alternating current supply source 13 by the use of a rectifier element such as 14, for example. An adjustable resistance element 31 may be provided for adjusting or setting the magnitude of the direct current flowing in the compensating winding 29.

It will be appreciated that the compensating winding 29 produces a unidirectional flux in opposition to the fluxes of the windings 21, 23 and 24 and this flux may be adjusted to a sufficient magnitude to neutralize the unidirectional fluxes produced by the windings 21 and 23 when no current flows in the input winding 24. This materially increases the range of the device as well as its sensitivity because, as stated hereinbefore, the unidirectional flux in the core produced by the windings 21 and 23, even though the input to the winding 24 is zero, tends to produce some saturation in the core, and consequently, if this flux is neutralized the reactance of the windings 21 and 23 will be increased.

Furthermore, quite often in connection with the operation of electric gages and other measuring devices employing Wheatstone bridge circuits, it is practically impossible to obtain a complete balance of the bridge. Under such circumstances the rectifier 14 would pass a current to the input winding 24. The effect of this current may also be compensated by adjusting the input to the compensating winding 29 so that the measuring device may give the desired indication for the zero reference point. Moreover, in many measuring operations when comparison methods are employed, it is desired to have the measuring device give a minimum indication for a standard value of current or voltage and in this case the measurements are obtained in terms of deviations from the standard or reference value. Even though the reactance of the coils 21 and 23 is greatly increased by the use of the compensating winding 29 over what it would otherwise be, there may nevertheless be a small current flowing in the measuring instrument 18 when the current in the input winding 24 is zero. The instrument may be brought to zero if desired by any suitable means such, for example, as a biasing potential placed across the terminals of the instrument.

Assume now that a direct current flows in the control winding 24 due to an unbalance of the Wheatstone bridge as produced by a change in the reactance of the gage coil 10. The permeability of the magnetic core 19 will be reduced. This reduction in permeability of the core reduces the self-induced counter voltage in the reactance windings 21 and 23 thereby reducing the reactive voltage drops across these windings, and hence more current is permitted to flow in the circuit 25 including the measuring instrument 18. By increasing the direct current in the input winding 24 until the core 19 is saturated well beyond the knee of its saturation curve, the reactance of the windings 21 and 23 will be greatly reduced thereby causing a proportionately greater current to flow in the coil of the measuring instrument.

The maximum input energy to the winding 24 necessary to produce a given output current in the measuring device 18 is very much less with a magnetic amplifier of this character than it is for a conventional saturable core reactor. In other words, the gain of the amplifier is increased manifold. This is perhaps explainable in large part by two factors. In the first place, as the magnitude of the alternating current increases in the circuit including the rectifier element 26 and the reactance windings 21 and 23 there is a corresponding increase in the average value of the unidirectional flux in the magnetic core 19 so that in a sense the device tends to saturate itself with unidirectional flux as the alternating current increases. Therefore, small additions to the flux due to a current in the input winding 24 will produce large changes in the reactance of the windings 21 and 23. In the second place, the increase in sensitivity and maximum amplification is due also in part to the fact that the unidirectional ampere-turns from the input winding 24 never have to oppose the reactance ampere-turns. With an ordinary saturable core reactor the current in the reactance windings reverses every cycle and in order to obtain minimum reactance the maximum direct current saturating ampere-turns have to be about 160% of the maximum effective alternating ampere-turns so that the 60% difference less losses will be sufficient to saturate the core when the magnetomotive force of the alternating current winding is opposite in direction with respect to that of the direct current winding.

The hereinbefore described measuring device is very effective and operates with highly satisfactory results. However, when the magnetic amplifier is connected as shown in Fig. 1, it has a gain which depends upon the value of the supply voltage, on the value of any bias currents that may be used in the compensating winding and on other variables such as rectifier resistance. For these reasons, it may be difficult to maintain the calibration of the gage within sufficiently close limits. When these conditions are present, I have found it preferable to employ a stabilized or degenerative feed-back circuit, such as illustrated in Fig. 2 of the drawing.

Referring to this figure, I have shown the output of the rectifier element 14 connected in series circuit relation with the direct current input winding 24 and the current conducting coil 32 of the measuring or recording device 18. The direct current output terminals 17 of the amplifier and the rectifier element 26 are connected across the terminals of the coil 32 and with the polarity such that the voltages of the rectifier elements 14 and 26 act in opposition. The remaining elements of the circuit are the same as described in connection with Fig. 1.

In order to obtain a better understanding of the principle of operation, assume that a small voltage is impressed on the input winding 24 due to an unbalance of the bridge 11. An output current will flow in the circuit 25 and consequently a unidirectional current will flow from the output of the rectifier 26 through the coil 32 of the measuring or recording element 18. Since the polarity of the voltage drop produced in the coil 32 from the output of the amplifier 16 is in the same direction as that applied to the coil 32 by the rectifier element 14, the output current from the amplifier 16 will rise until the voltage drop in the coil 32 almost balances out the voltage output of the rectifier element 14 and the degree to which this balance is carried out will depend upon the gain of the amplifier. A current will then be produced in the coil 32 of the indicating or recording instrument of such magnitude that the drop across the coil is at all times almost equal to the output voltage of the gage.

It will be seen that with this arrangement changes in amplification will now directly change the difference between the voltage output of the rectifier element 14 and the voltage drop in the coil 32 rather than directly affect the voltage of the coil 32. For example, if the gain of the amplifier is such that the voltage drop in the coil 32 is 99% of the voltage output of the rectifier element 14, a 50% decrease in gain will change the voltage drop in the coil 32 to 98% of the voltage of the rectifier element 14, a decrease of only 1%.

In Fig. 3 I have shown a modification of the arrangement of Fig. 2 wherein the amplifier consists of a plurality of stages. In this figure two of the amplifiers of the type shown in Figs. 1 and 2 are cascaded. This is obtained by connecting the direct current output terminals 17 of the rectifier 26 of Figs. 1 and 2, for example, to the direct current input winding 24' of the second amplifier 16' and by connecting the output terminals 17' of the bridge rectifier element 26' of the amplifier 16' to the coil 32 of the measuring or recording instrument 18.

While I have shown only two amplifiers connected in cascade, it will be appreciated that this may be continued indefinitely with any number of amplifiers. By means of this cascaded connection employing the compensating windings 29 and 29' the amplification range is practically unlimited and a very feeble current in the input winding 24 may be made to produce a high torque in the measuring element 18.

It should be understood that the compensating windings 29 and 29' bear the same relation to their associated reactance windings as is present in Fig. 2. In other words, the current produced in the compensating winding 29' from the energy source 30' is not changed or increased in order to compensate for any effect produced by cascading of the amplifiers. Because of the fact that there may be a small output current flowing through the rectifier elements 26 and 26' even though there is no current flowing in the winding 24, by providing each of the stages of the amplifier with compensating means the direct current excitation applied to the input winding of the second amplifier is proportional only to the direct current excitation applied to the preceding reactor or stage of the amplifier. The magnetizing current drawn by the first reactor when there is no direct current saturating effect applied thereto thus exercises little or no saturating effect upon the second reactor which, in the cascade system, it precedes.

I have thus provided a simple measuring system of rugged construction which is highly sensitive, and quickly responding and which is particularly useful in measuring, recording, telemetering and similar operations where a quantity proportional to a minute electrical effect is obtained and where it is desired to operate measuring instruments which require considerably greater torque for their operation than the usual highly sensitive and correspondingly expensive deflecting instruments. Consequently, the use of such an amplifier permits the employment of low-cost, low-sensitivity instruments.

While I have shown and described several embodiments of my invention for the purpose of explaining the principle of operation, I wish it to be understood that I do not confine myself to the precise details of the construction herein set forth by way of illustration as it is apparent that changes and variations may be made therein by those skilled in the art without departing from the spirit of the invention or the scope of the appended claims.

What I claim as new and desire to secure by Letters Patent of the United States is:

1. In electrical measuring apparatus, an alternating current circuit, a magnetic amplifier having a core of magnetic material provided with a reactance winding, said reactance winding being connected in said circuit in series with a unidirectional current conducting device whereby only half-wave current flows in said winding, a direct current input winding arranged on said core for producing a unidirectional flux in said core, means for energizing said input winding with direct current proportional to a quantity to be measured and of such polarity that the flux produced thereby in said core is in the same direction as the flux produced by said reactance winding, a compensating winding arranged on said core and energized to produce a unidirectional flux which is opposite to the flux produced by said reactance and input windings, and a measuring device connected in series with said reactance winding and said unidirectional current conducting device.

2. In electrical measuring apparatus, a core of magnetic material, a pair of reactance windings on said core, a pair of unidirectional current conducting devices, an alternating current circuit, an input winding arranged on said core for producing a unidirectional flux in said core, means for energizing said input winding with a direct current proportional to a quantity to be measured, each of said reactance windings being connected in series with a separate one of said conducting devices, one of said reactance windings and its series-connected conducting device being connected in said alternating current circuit in parallel with the other reactance winding and its series-connected conducting device in such a manner that alternating current can flow in said alternating current circuit while said reactance windings produce unidirectional flux in said core in the same direction as the flux produced by said input winding, and means including a full-wave rectifier for measuring the current flowing in said alternating current circuit as a function of the quantity to be measured.

3. In a device for measuring electrical quantities, an amplifier having input and output circuits, a measuring device responsive to direct current, said input circuit and said measuring device being connected in series circuit relation to a direct current voltage to be measured, the output circuit of said amplifier including an alternating current source of supply, a full-wave rectifier having direct current output terminals of positive and negative polarity, and an element whose impedance varies in accordance with the flow of current in said input circuit, means for connecting said positive output terminal to the terminal of higher potential of said measuring device as determined by said direct current voltage to be measured, and means for connecting said negative output terminal to the other terminal of said measuring device.

4. In a device for measuring electrical quantities, a core of magnetic material, an input winding on said core, an electrical measuring device, said input winding and said measuring device being connected in series and energized in accordance with variations in a direct current quantity to be measured, a pair of reactance windings on said core, a pair of unidirectional current conducting devices, an alternating current circuit, each of said reactance windings being connected in series with a separate one of said conducting devices, one of said reactance windings and its series-connected conducting device being connected in said alternating current circuit in parallel with the other reactance winding and its series-connected conducting device in such a manner that alternating current can flow in said alternating current circuit while said reactance windings produce unidirectional flux in said core in the same direction as the flux produced by said input winding, and means for impressing a direct current voltage across said measuring device proportional to the current flowing in said alternating current circuit, said direct current voltage being in opposition to the voltage across said measuring device due to the direct current quantity to be measured.

5. In a device for measuring electrical quantities, a core of magnetic material, an input winding on said core, an electrical measuring device, said input winding and said measuring device being connected in series and energized in accordance with variations in a direct current quantity to be measured, a pair of reactance windings on said core, a pair of unidirectional current conducting devices, an alternating current circuit, each of said reactance windings being connected in series with a separate one of said conducting devices, one of said reactance windings and its series-connected conducting device being connected in said alternating current circuit in parallel with the other reactance winding and its series-connected conducting device in such a manner that alternating current can flow in said alternating current circuit while said reactance windings produce unidirectional flux in said core in the same direction as the flux produced by said input winding, means associated with said core for producing a unidirectional flux therein which is substantially equal and opposite to the flux produced by said reactance windings when there is no current flow in said input winding due to the direct current quantity to be measured, and means for impressing a direct current voltage across said measuring device proportional to the current flowing in said alternating current circuit, said direct current voltage being in opposition to the voltage across said measuring device due to the direct current quantity to be measured.

6. In a device for measuring electrical quantities, a magnetic amplifier of the saturable reactor type having direct current input and output terminals, an electrical measuring device, said measuring device and said input terminals being arranged in series circuit relation and adapted to be connected to a direct current quantity to be measured, said amplifier including means inductively related to the direct current flowing through said input terminals for producing corresponding amplified variations in the direct current flowing through said output terminals, and means connecting said direct current output terminals respectively to the terminals of like polarity of said measuring device as determined by the current flow in said measuring device due to the direct current quantity to be measured.

7. A device for measuring direct current, comprising an iron core having a direct current winding and a first and second reactance winding, two half-wave rectifiers, the first reactance winding being connected in series with one of said rectifiers in an auxiliary circuit energized with an alternating current voltage, the second reactance winding being connected in a series circuit with the other of said rectifiers and forming a shunt path around said first reactance winding and its series-connected rectifier, said rectifiers being poled oppositely to permit alternating current to flow in said auxiliary circuit and said reactance windings being arranged to produce unidirectional fluxes in the same direction as the unidirectional flux produced by said direct current winding, an electrical measuring device, a series circuit energized with direct current to be measured and including said direct current winding and said measuring device, and means for obtaining a direct current voltage proportional to the current flowing in said reactance windings, the positive and negative terminals of said direct current voltage being connected to terminals of like polarity of said measuring device as determined by the direct current to be measured which flows in said measuring device.

8. In a measuring system of the stabilized or degenerative feed-back type, a magnetic amplifier of the saturable-core reactor type having a direct current input winding and a reactance winding, a measuring device responsive to direct current, a first series circuit adapted to be connected to the direct current quantity to be measured and including said input winding and said measuring device, a half-wave rectifier, a second series circuit adapted to be connected to an alternating current source and including said reactance winding and said rectifier, said reactance winding producing a pulsating unidirectional flux in said core in the same direction as the flux produced therein by said direct current winding, and means for deriving a direct current voltage proportional to the current flowing in said second series circuit, the positive and negative terminals of said direct current voltage being connected to terminals of like polarity of said measuring device as determined by the direct current flowing in said first series circuit.

9. In a measuring system of the stabilized or degenerative feed-back type, a magnetic amplifier of the saturable-core reactor type having a direct current input winding and a reactance winding, a second direct current winding, a measuring device responsive to direct current, a first series circuit adapted to be connected to the direct current quantity to be measured and including said input winding and said measuring device, a half-wave rectifier, a second series circuit adapted to be connected to an alternating current source and including said reactance winding and said rectifier, said reactance winding producing a pulsating unidirectional flux in said core in the same direction as the flux produced therein by said direct current winding, means for energizing said second direct current winding to produce a unidirectional flux in the core of said amplifier in opposition to the flux produced therein by said input winding and said reactance winding, and means for deriving a direct current voltage proportional to the current flowing in said second series circuit, the positive and negative terminals of said direct current voltage being connected to terminals of like polarity of said measuring device as determined by the direct current flowing in said first series circuit.

CLAUDE M. HATHAWAY.